United States Patent [19]
Behrens

[11] 3,721,076
[45] March 20, 1973

[54] ADJUSTABLE MOWER SUSPENSION SYSTEM
[75] Inventor: Robert Nick Behrens, Horicon, Wis.
[73] Assignee: Deere & Company, Moline, Ill.
[22] Filed: Oct. 4, 1971
[21] Appl. No.: 186,243

[52] U.S. Cl. ................................................. 56/14.9
[51] Int. Cl. ............................................ A01d 35/26
[58] Field of Search ............ 56/14.9, 15.1, 15.8, 15.9, 56/16.3, 6, 7

[56] References Cited

UNITED STATES PATENTS

| 3,063,226 | 11/1962 | Pfauser | 56/14.9 X |
| 3,283,486 | 11/1966 | Marek et al. | 56/16.3 |
| 2,502,063 | 3/1950 | Rust | 56/15.8 |

Primary Examiner—Louis G. Mancene
Assistant Examiner—J. N. Eskovitz
Attorney—H. Vincent Harsha et al.

[57] ABSTRACT

An electric drive riding lawn mower includes a pair of electrically driven rear drive wheels and steerable front wheels controlled by a steering wheel mounted in an upright supporting structure at the forward end of the machine. A rotary mower unit is suspended from the main frame between the front and rear wheels and includes a generally horizontal housing connected to the main frame by front and rear links which permit the vertical movement of the mower unit between a lowered operating position and a raised transport position. The position of the mower unit is controlled by a lever pivotally mounted alongside the support structure and connected to the mower unit by a cable, the control lever being lockable in a rearward position wherein it maintains the mower unit in its raised position, and swingable forwardly to lower the mower unit. An adjustable stop limits the forward movement of the control lever to establish the lowermost, operating position of the mower unit.

9 Claims, 4 Drawing Figures

PATENTED MAR 20 1973 3,721,076
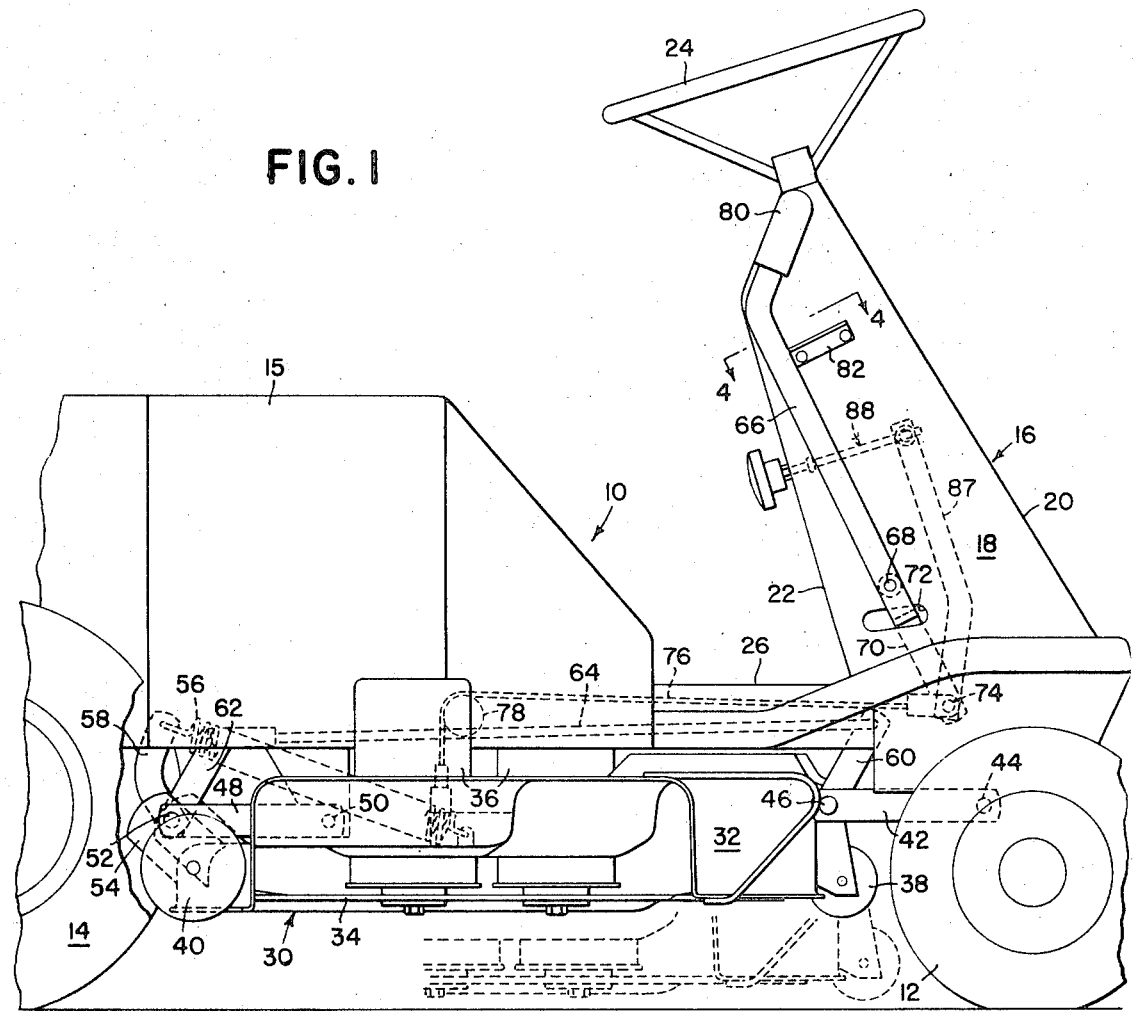
FIG. 1
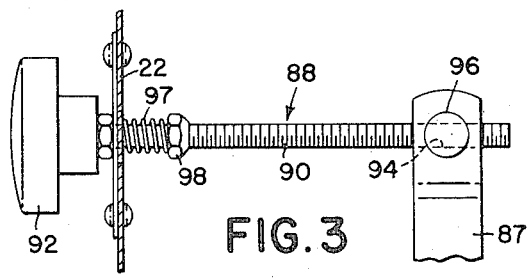
FIG. 2
FIG. 3
FIG. 4
INVENTOR.
R. N. BEHRENS

ADJUSTABLE MOWER SUSPENSION SYSTEM

BACKGROUND OF THE INVENTION

This invention relates to a tractor-mower unit, and more particularly to a mechanism for suspending the mower unit from the tractor.

It is conventional in lawn and garden tractors or the smaller tractor-mower units of the type known as riding mowers to suspend the mower unit between the front and rear wheels of the vehicle, and further to provide means for raising and lowering the mower unit.

In many prior suspension devices, the mower unit rides on the ground during the mowing operation and is raised only for transport. This type of suspension requires adjustment of gauge wheels and the like to vary the cutting height of the mower. In many other machines, the mower unit is suspended from the tractor and its height is controlled by a manually-actuated linkage which is lockable in different positions to establish the different cutting heights, which vary in increments.

SUMMARY OF THE INVENTION

According to the present invention, an improved suspension system is provided for suspending a mower unit from a riding mower or the like. More specifically, the suspension system provides means for easily raising and lowering the mower unit between a raised transport position and a lowered operating position, wherein the mower unit is entirely supported on the vehicle.

An important feature of the invention resides in the provision of means for easily adjusting the operating height of the mower unit in infinitely variable positions.

Another feature of the invention resides in the use of a cable-type mechanism for suspending and raising and lowering the mower unit.

Still another feature of the invention resides in the location of the control lever of the suspension mechanism on the steering column of the riding mower, wherein it will not interfere with other components on the machine and is easily manipulated by the operator, and further in providing adjusting means on the steering column for adjusting the cutting height of the mowing unit, even during the operation of the mower.

Still another feature of the invention resides in the simple and rugged construction of the suspension mechanism and the means for adjusting the cutting height.

BRIEF DESCRIPTION OF THE DRAWINGS

FIG. 1 is a side elevation view of a riding lawn mower with portions of the front and the rear of the riding mower removed and with the mower unit shown in its raised position, the lowered operating position of the mower unit being shown in dotted lines.

FIG. 2 is a side elevation view of part of the control mechanism for the suspension of the mower unit, the control mechanism being shown in its lowered operating position.

FIG. 3 is an enlarged side elevation view of the mechanism for adjusting the cutting height.

FIG. 4 is a plan section view of a portion of the steering column as viewed along the line 4—4 of FIG. 1.

DESCRIPTION OF THE PREFERRED EMBODIMENT

The invention is embodied in a riding mower having a mobile main frame, indicated in its entirety by the numeral 10 and mounted on a pair of steerable front wheels 12 and rearward drive wheels 14. The drive wheels are driven by a battery-powered electric drive system (not shown) disposed in a housing 15 on the rearward portion of the vehicle. An operator's seat (not shown) is conventionally mounted on the forward part of the housing 15, so that the operator's seat is behind a generally upright support structure or steering column 16 at the forward end of the vehicle. The supporting structure 16 is hollow and includes a pair of opposite sidewalls 18, an upwardly and rearwardly inclined front wall 20, and a rear wall 22. A steering wheel 24 is disposed at the upper end of the support structure 16 and is connected to the front wheels 12 through a conventional steering mechanism. The seated operator, of course, manipulates the steering wheel and rests his feet on a platform 26 on the opposite sides of the support structure 16 and forwardly of the housing 15.

A rotary mower unit, indicated in its entirety by the numeral 30, is suspended from the main frame and includes a generally horizontal housing or deck 32, which, as is conventional, is open toward the bottom and has a discharge opening at the right side of the unit. A pair of horizontal cutting blades 34 are directly mounted on the shafts of electric motors 36, which are powered by the same batteries as the main vehicle drive. A horizontal transverse roller 38 is mounted at the front of the housing 32 to prevent the blades from scalping the turf on irregular terrain, and a pair of rear anti-scalping wheels 40 are similarly mounted at the rear of the housing to raise the mower unit over raised portions of the turf.

The mower unit 30 is suspended from the main frame for generally vertical adjustment between a raised or transport position, as shown in full lines in FIG. 1, and a lowered or operating position, as shown in dotted lines, by means of a parallelogram linkage, which includes a pair of transversely spaced, generally fore-and-aft links 42, having their front ends connected to a transverse pivot 44 carried by the main frame and their rearward ends connected to a transverse shaft 46 mounted at the forward end of the mower housing 32, only the right-hand link 42 being shown in FIG. 1. The rearward portion of the parallelogram-type linkage is formed by a generally fore-and-aft rear link 48 having its forward end pivotally connected to the main frame at 50 and its rearward end connected to a transverse shaft 52 journaled in a bracket 54 connected to a rearward end of the housing 32.

A tension spring 56 has its forward end connected to the housing 32 and its rearward end connected to an arm 58 extending radially from the shaft 52, so that the spring force tends to rotate the shaft 52 and raise the mower unit, thereby partly counterbalancing the weight of the unit. The mower unit is maintained in a level condition by a parallelogram-type linkage which includes a front leveling arm 60 extending radially upwardly from the shaft 46 and a rear leveling arm 62 extending radially upwardly from the rear pivot shaft 52, the arms 60 and 62 being interconnected by an adjustable link 64, the length of which is adjustable to vary the attitude of the mower unit.

Mounted alongside the support structure 16 is an elongated, generally upright control lever 66, which is swingably mounted on a transverse pivot 68 extending outwardly from the right sidewall 18 of the support structure. An abutment sleeve 69 is mounted on the pivot 68 within the support structure 16, and the control lever has an offset portion 70 immediately below the pivot 68, the lower end of the control lever extending inwardly through a slot 72 in the right sidewall 18 to the interior of the supporting structure. The lower end of the control lever is provided with a transverse pivot 74, to which is connected the forward end of a suspension cable 76, which is trained around a frame mounted pulley 78 and has its other end connected to the mower housing 32.

The upper end of the control lever 66 is provided with a handle 80. As is apparent, the weight of the mower unit tends to rotate the control lever in a clockwise direction to move the handle 80 forwardly, and the mower unit is raised by pulling rearwardly on the handle 80 and lowered by allowing the handle 80 to move forwardly. A latch 82 is mounted on the right sidewall 18 of the support structure and is operative to releasably lock the control lever in its rearward position, as shown in FIG. 1, wherein it maintains the mower unit in a raised position. As best shown in FIG. 4, the latch 82 is formed by an angled member secured to the support structure sidewall and having a cam surface 84 generally parallel to the sidewall and a transverse abutment 86 at the rear of the cam surface. As the control lever is swung rearwardly, it engages the cam surface 84 and is shifted outwardly until it clears the rearward end of the latch, whereupon it springs toward the support structure and engages the abutment 86, which prevents forward movement of the control lever. To release the latch, the control lever is simply deflected laterally until it clears the abutment 86 at which time the raised mower unit will tend to move it forwardly.

An elongated, generally vertical member or arm 87 has its lower end pivotally connected to the lower end of the control lever 66 by means of the pivot 74, while the upper end of the arm 66 is positioned by an adjusting mechanism, indicated in its entirety by the numeral 88. The adjusting mechanism includes a threaded fore-and-aft extending rod 90 extending through and journaled in the rear wall 22 of the support structure and having a handle 92 at its rearward end to facilitate rotation of the rod. The forward end of the rod extends through a threaded bore 94 in a transverse pivot 96 carried at the upper end of the arm 87, which is preferably bifurcated to support the pivot 96. A helical compression spring 97 around the rod 90 operates between the supporting structure and a nut 98 on the threaded rod to maintain the fore-and-aft position of the rod relative to the support structure. As is apparent, rotation of the rod 90 via the handle 92 causes the upper end of the arm 87 to move forwardly or rearwardly, depending upon which direction the rod is rotated.

In operation, the mower unit is raised by pulling rearwardly on the control lever 66 and holding the lever in its rearward position by means of the latch 82 as previously described. When the upper end of the control lever is shifted laterally to clear the latch and allowed to move forwardly, the lower end of the control lever swings rearwardly, allowing the cable to move rearwardly and the mower unit to lower. However, the rearward movement of the lower end of the control lever also causes the lower end of the arm 87 to move rearwardly about the pivot 96 until the arm engages the sleeve 69 on the pivot 68, as shown in FIG. 2, at which time further movement of both the arm and the control lever is stopped, thereby stopping the downward movement of the mower unit. The position of the arm 87 when it engages the sleeve 69 depends on the location of the upper end of the arm. Thus, by moving the pivot 96 rearwardly via the adjusting mechanism 88, the lower end of the control lever and the lower end of the arm 87 would not be allowed to move as far to the rear before the arm engages the sleeve 69, so that the mower unit would not drop as far. Conversely, shifting of the pivot 96 forwardly allows greater motion of the lower end of the control lever before the sleeve 69 is engaged to limit additional movement. In the drawings, the pivot is shown in its forwardmost position, so that the mower unit, when lowered, is disposed in its lowermost position. As is apparent, the cutting height of the mower unit can thus easily be adjusted into infinitely variable positions by simply rotating the handle 92, even when the mower is operating.

I claim:

1. In a riding lawn mower having a mobile main frame supported on front and rear wheels and a mower unit suspended from the main frame between the front and rear wheels and including a generally horizontal housing, the improvement comprising: linkage means extending between the main frame and the housing and operative to permit generally vertical movement of the mower unit while maintaining it in a generally horizontal condition; a manually adjustable lever means mounted on the main frame for swinging in opposite generally fore-and-aft directions; a cable means operatively interconnecting the lever means and the mower unit so that the mower unit is raised in response to the movement of the lever means in one direction and lowered in response to movement in the opposite direction; latch means operatively associated with the lever means for releasably locking the lever means in a raised position wherein it maintains the mower unit in an elevated condition above the ground; a stop means operatively communicating with the lever means for limiting the movement of the lever means in said opposite direction and thereby establishing the lowermost position of the mower unit; and adjustment means operatively connected to the stop means for selectively adjusting the position of the stop means and varying the lowermost position of the mower unit.

2. The invention defined in claim 1 wherein the stop means includes an abutment on the main frame and an adjustable member connected to the lever means and engageable with the abutment to limit the movement of the lever means, and the adjustment means is operatively associated with said adjustable member to vary the position of the adjustable member and thereby vary the position of the lever member when the adjustable member engages the abutment.

3. The invention defined in claim 2 wherein the adjustable member is pivotally connected to the lever means for swinging about an axis parallel to the lever means pivot axis and the adjustment means includes a rotatable threaded rod operatively connected to the adjustable member for swinging the member about its pivot axis in response to rotation of the rod.

4. The invention defined in claim 3 wherein the lever means includes a generally upright control lever swingably mounted on a transverse pivot for swinging in a fore-and-aft direction and the adjustable member is vertically elongated and has its lower end connected to the control lever and its upper end connected to the threaded rod for adjustment in a fore-and-aft direction, the control lever pivot forming the abutment which engages an intermediate portion of the adjustable member to limit the movement of the adjustable member and the control lever connected thereto.

5. In a riding mower having a mobile main frame including a generally upright support structure at the forward end of the machine and a mower unit suspended from the frame via linkage means which permits vertical adjustment of the mower unit between a lowered operating position and a raised transport position, the improvement comprising: a generally upright control lever mounted on a transverse pivot on the support structure for swinging in a fore-and-aft arc; a connecting means between the lower end of the control lever and the mower unit for respectively raising and lowering the mower unit in response to rearward and forward swinging of the control lever; a latching means for releasably holding the control lever in a rearward position wherein it maintains the mower unit in its raised transport position; a stop means for limiting the forward movement of the control lever and thereby establishing the lowered operating position of the mower unit; and adjusting means operatively communicating with the stop means for selectively adjusting the stop means and thereby vary the operating position of the mower unit.

6. The invention defined in claim 5 wherein the stop means includes a generally upright arm having its lower end pivotally connected to the lower end of the control lever by a transverse pivot and its upper end connected to the supporting structure, an intermediate portion of said arm engaging an abutment to limit the rearward movement of the lower end of the control lever.

7. The invention defined in claim 6 wherein the adjusting means operatively connects the upper end of said arm to the supporting structure for selectively varying the position of the upper end of the arm and thereby varying the position of the lower end of the arm and the control lever when the arm engages the abutment.

8. The invention defined in claim 7 wherein the adjusting means includes a fore-and-aft rod rotatably mounted in the supporting structure and having its forward end connected to the arm, and thread means operatively associated with the rod for shifting the arm in a fore-and-aft direction in response to rotation of the rod.

9. The invention defined in claim 8 wherein the connecting means between the control lever and the mower unit includes a cable trained around a pulley on the main frame and having its forward end connected to the control lever and its rearward end connected to the mower unit.

* * * * *